United States Patent
Barbereau

(10) Patent No.: US 12,466,660 B2
(45) Date of Patent: Nov. 11, 2025

(54) SCREW CONVEYOR ARRANGEMENT WITH SUPPORT UNIT

(71) Applicant: Tetra Laval Holdings & Finance S.A., Pully (CH)

(72) Inventor: Elie Barbereau, Cholet (FR)

(73) Assignee: Tetra Laval Holdings & Finance S.A., Pully (CH)

(*) Notice: Subject to any disclaimer, the term of this patent is extended or adjusted under 35 U.S.C. 154(b) by 80 days.

(21) Appl. No.: 18/565,562

(22) PCT Filed: May 30, 2022

(86) PCT No.: PCT/EP2022/064621
§ 371 (c)(1),
(2) Date: Nov. 30, 2023

(87) PCT Pub. No.: WO2022/253758
PCT Pub. Date: Dec. 8, 2022

(65) Prior Publication Data
US 2024/0239611 A1    Jul. 18, 2024

(30) Foreign Application Priority Data
Jun. 2, 2021 (EP) .................................. 21177300

(51) Int. Cl.
*B65G 33/14* (2006.01)
*B65G 33/34* (2006.01)

(52) U.S. Cl.
CPC ............ *B65G 33/14* (2013.01); *B65G 33/34* (2013.01)

(58) Field of Classification Search
None
See application file for complete search history.

(56) References Cited

U.S. PATENT DOCUMENTS 2,378,658 A * 6/1945 Rensch ................ B65G 33/34
                                                                198/674
4,274,790 A    6/1981 Barker
(Continued)

FOREIGN PATENT DOCUMENTS

| CN | 107934413 A | 4/2018 |
| JP | 2011069107 A | 4/2011 |
| KR | 20200017620 A | 2/2020 |

OTHER PUBLICATIONS

Extended European Search Report dated Nov. 10, 2021, for European Patent Application No. 21177300.7.
(Continued)

*Primary Examiner* — Kavel Singh
(74) *Attorney, Agent, or Firm* — Renner, Otto, Boisselle & Sklar, LLP

(57) ABSTRACT

A screw conveyor arrangement is configured to convey a material, for example a food powder, in a processing plant. The screw conveyor arrangement comprises a casing with an internal channel, and a helical screw in the channel. A drive unit is releasably connected to a first portion of the casing to engage the helical screw. A support unit is attached to the casing and the drive unit to define a pivoting movement of the drive unit away from the first portion when the drive unit has been released from the casing. The support unit facilitates handling of the drive unit during maintenance and service, for example cleaning, and allows the drive unit to be swung away to provide access to the helical screw and the channel. The support unit may be provided for attachment to existing screw conveyors.

10 Claims, 3 Drawing Sheets

(56) References Cited

U.S. PATENT DOCUMENTS

| | | | | | |
|---|---|---|---|---|---|
| 4,875,820 | A | * | 10/1989 | Lepp | B65G 33/32 |
| | | | | | 198/615 |
| 5,351,807 | A | * | 10/1994 | Svejkovsky | B65G 27/32 |
| | | | | | 198/756 |
| 5,699,897 | A | * | 12/1997 | Svejkovsky | B65G 27/12 |
| | | | | | 198/750.7 |
| 9,288,946 | B1 | * | 3/2016 | Schuld | A01F 25/2018 |
| 10,238,042 | B2 | * | 3/2019 | Ahlén | A01F 25/2018 |
| 10,518,980 | B2 | * | 12/2019 | Gerdeman | B65G 33/32 |
| 11,066,247 | B2 | * | 7/2021 | Walker | B65G 33/32 |

OTHER PUBLICATIONS

International Search Report mailed Sep. 14, 2022, for International Patent Application No. PCT/EP2022/064621.

\* cited by examiner

SCREW CONVEYOR ARRANGEMENT WITH SUPPORT UNIT

TECHNICAL FIELD

The present disclosure generally relates to the field of screw conveyors and in particular to a screw conveyor arrangement configured to facilitate disassembly and maintenance.

BACKGROUND ART

A screw conveyor is a device that uses a rotating helical screw, often denoted auger or "flighting", usually within a tube, to move liquid, granular or semi-solid materials. These devices are used in many bulk handling industries, including but not limited to the food processing plants. Screw conveyors in modern industry are often used horizontally or at a slight incline as an efficient way to move materials such as cereal grains, food powder, food ingredients, food waste, meat, bone meal, animal feed, aggregates, wood chips, boiler ash, municipal solid waste, and many others.

Screw conveyors define an internal channel containing the helical screw, which may be configured as a spiral blade coiled around a shaft or a shaftless spiral. The rate of volume transfer is proportional to the rotation rate of the shaft. In industrial control applications, the device is often used as a variable rate feeder by varying the rotation rate of the shaft to deliver a measured rate or quantity of material into a process. The helical screw is typically driven by an electrical motor, which is bolted or otherwise attached onto a casing portion to engage the helical screw at one end of the internal channel.

In industry settings, periodic service and maintenance is imperative to ensure consistent output quality and high availability. Such service and maintenance may include replacing, inspecting or cleaning the helical screw, cleaning or inspecting the internal channel, servicing or inspecting the motor or any transmission component between the motor and the helical screw. The disassembly and reassembly of the screw conveyor during service and maintenance involves significant manual work and handling of heavy objects and is generally time consuming.

These shortcomings are common to a large number of screw conveyors that are currently in use in industrial facilities.

SUMMARY

It is an objective to at least partly overcome one or more limitations of the prior art.

One such objective is to facilitate disassembly of a screw conveyor for service and maintenance.

Another objective is to facilitate access to the helical screw and the internal channel of existing screw conveyors.

One or more of these objectives, as well as further objectives that may appear from the description below, are at least partly achieved by a screw conveyor arrangement and a support unit according to the independent claims, embodiments thereof being defined by the dependent claims.

A first aspect is a screw conveyor arrangement. The screw conveyor arrangement comprises a casing that defines an elongate channel; a helical screw which is arranged in the channel to extend from a first portion of the casing to a second portion of the casing; a drive unit, which is releasably connected to the casing at the first portion and arranged to engage the helical screw; and a support unit which is attached to the casing and to the drive unit and configured to define a pivoting movement of the drive unit away from the first portion when the drive unit has been released from the casing.

The screw conveyor arrangement of the first aspect comprises a support unit that is attached to the casing to support the drive unit during service and maintenance, when the drive unit is released from the casing. The provision of the support unit thereby reduces the time required for service personnel to access the helical screw and the internal channel and greatly facilitates handling of the drive unit. By being configured to define a pivoting movement, the support unit allows the drive unit to be swung away from the first end portion of the casing, from which the drive unit has been released, to provide access to the helical screw and the internal channel. The configuration of the support unit thereby allows service personnel to safely move the drive unit out of the way in a controlled fashion. By swinging the drive unit away from the first end portion, service personnel may gain free access to the end portion and attain a working position that puts less strain on the human body. Depending on implementation, the pivoting movement may also allow the helical screw to be withdrawn from the internal channel at the first end portion. It is realized that the support unit by its supporting function reduces the risk of injuries, as well as the risk of components being dropped to the floor.

Existing screw conveyors may be converted into the screw conveyor arrangement of the first aspect by proper installation of the support unit. Thus, the first aspect provides an efficient, simple and convenient solution to shortcomings of many screw conveyors that are currently in use in industrial facilities.

In the following, various embodiments of the first aspect are defined. These embodiments provide at least some of the technical effects and advantages described in the foregoing, as well as additional technical effects and advantages as readily understood by the skilled person, e.g. in view of the following detailed description. Such additional technical effects and advantages include, but are not limited to, further facilitating access to the helical screw and the internal channel, improving the versatility of the support unit, providing a simple and/or robust construction of the support unit, providing simple installation of the support unit on the casing and/or the drive unit, etc.

In some embodiments, the support unit is further configured to define a sliding movement of the drive unit away from the first portion casing when the drive unit has been released from the casing.

In some embodiments, the support unit comprises a hinge element that defines a pivot axis for the pivoting movement.

In some embodiments, the support unit is attached to the casing with the pivot axis of the hinge element substantially parallel with gravity.

In some embodiments, the support unit comprises a first sub-unit for attachment to the casing and a second sub-unit for attachment to the drive unit, and the first and second sub-units are joined by the hinge element.

In some embodiments, the hinge element comprises a pivot pin arranged in a guide element, the guide element is part of the second sub-unit, and the first sub-unit is connected to the pivot pin.

In some embodiments, the first sub-unit comprises a base element for attachment to the casing, and a slider element which is arranged for sliding movement relative to the base element in a direction substantially transverse to gravity, wherein the slider element is joined to the second sub-unit by the hinge element.

In some embodiments, the slider element comprises a support rod which is arranged for sliding movement in spaced apart holders on the base element.

In some embodiments, the support rod is connected to the hinge element.

In some embodiments, the slider element comprises a further support rod, which is arranged for sliding movement in spaced apart further holders on the base element, and the support rod and the further support rod are mutually parallel and connected to the hinge element.

In some embodiments, the base element is attached to the casing to arrange the support rod above the further support rod, wherein an end of the support rod and an end of the further support rod are connected to the hinge element.

In some embodiments, the base element comprises a clamp portion which is releasably attached to the casing, and the clamp portion is arranged to surround the casing and comprises a releasable bracket, which is shaped to mate with an outer contour of the casing.

In some embodiments, the second sub-unit comprises a plate-shaped element with through holes that are arranged to mate with attachment holes in a flange of the drive unit.

In some embodiments, the casing comprises a support pin that projects into the channel at the second portion, the drive unit comprises a drive pin that projects into the channel at the first portion when the drive unit is connected to the casing at the first portion, and the helical screw is arranged in engagement with the drive pin and the support pin.

A second aspect is a support unit for use in the screw conveyor arrangement of the first aspect or any of its embodiments. The support unit of the second aspect shares the advantages of the screw conveyor arrangement according to the first aspect. All embodiments of the first aspect, insofar as they apply to the support unit, are equally applicable to the second aspect.

A third aspect is a method of operating a screw conveyor arrangement in accordance with the first aspect or any of its embodiments. The method comprises: operating the screw conveyor arrangement to convey a first food powder; releasing the drive unit from the casing; pivoting the drive unit away from the first portion; cleaning at least one of the helical screw or the elongate channel; pivoting the drive unit towards the first portion; attaching the drive unit to the casing; and operating the screw conveyor arrangement to convey a second food power.

Still other objectives, embodiments, features, aspects and technical advantages will appear from the following detailed description as well as from the drawings.

DETAILED DESCRIPTION

Embodiments will now be described more fully hereinafter with reference to the accompanying drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, the term "and/or" includes any and all combinations of one or more of the associated listed items.

Well-known functions or constructions may not be described in detail for brevity and/or clarity. Unless otherwise defined, all terms (including technical and scientific terms) used herein have the same meaning as commonly understood by one of ordinary skill in the art to which this disclosure belongs.

Figure 1:
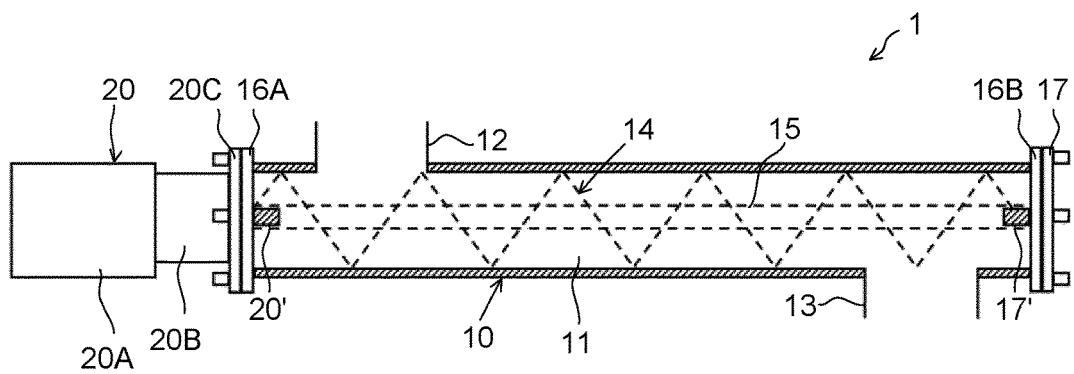
FIG. 1 is a schematic side view, partly in section, of a screw conveyor.

FIG. 1 is a schematic side view of a screw conveyor 1, with some parts being shown in cross-section or indicated by dashed lines. FIG. 1 is merely given to show an example of a conventional screw conveyor or screw feeder to facilitate understanding of the subsequent disclosure. The screw conveyor 1 comprises a tubular casing or housing 10 that defines an internal channel 11. The casing 10 defines one or more inlets 12 (one shown) at a feed end of the screw conveyor 1, and one or more outlets 13 (one shown) at a discharge end of the screw conveyor 1. The channel 11 is elongate and accommodates a helical screw 14, which is arranged for rotation in the channel 11. The helical screw 14 is also known as flighting or auger. In FIG. 1, the screw 14 is configured as a spiral blade coiled around a central shaft 15. In an alternative configuration, the screw 14 may be a "shaftless spiral" which defines the spiral blade without the central shaft. The channel 11 extends from a first portion 16A of the casing 10 to a second portion 16B of the casing 10. The channel 11 may have a cross-section that matches the outer contour of the screw 14, optionally with a margin. In the detailed examples described further below, the channel 11 has a circular cross-section.

The screw 14 is driven to rotate in the channel 11 by a drive unit 20 which is releasably connected to the casing at the first portion 16A. The drive unit 20 comprises a motor 20A, which may be electrically powered. In the example of FIG. 1, the drive unit 20 comprises a connector 20' which is driven to rotate by the motor 20A and which is engaged with the screw 14. The connector 20' may have any configuration. To facilitate disassembly of the screw conveyor, the connector 20' may be in form-fitted engagement with the screw 14 such that engagement is released when the connector 20' is pulled away from the screw 14, or vice versa. In the illustrated example, the drive unit 20 comprises an intermediate block 20B between the motor 20A and the casing 10. The block 20B may comprise bearings for the connector 20', a drive shaft, a transmission connected to the motor 20A, etc. Generally, the drive unit 20 may be of conventional configuration and include any combination of conventional components.

The illustrated screw conveyor 1 is suited for use in food processing plants or other facilities with strict hygienic requirements. In these environments, it is desirable to limit the access points at which the casing 10 can be dissembled for gaining access to the channel 11 and the screw 14. Each such access point forms a joint where substances may accumulate over time and impair hygiene. Each access point also poses a risk for leaks from the channel 11 to the surroundings. To mitigate these risks, the screw conveyor 1 in FIG. 1 is configured to provide access to the channel 11 via the portions 16A, 16B only. In the illustrated example, the first portion 16A defines an end flange. A corresponding flange 20C on the drive unit 20 mates with and is releasably connected to the end flange 16A. Any type of releasable connection element(s) may be used to form the releasable connection, including but not limited to bolts (as shown), a clamp, a fixture, etc. Similarly, the second portion 16B defines an end flange. An end plate 17 is releasably connected to the end flange 16B, in this example by bolts extending through the end plate 17 into engagement with the end flange 16B. The end plate 17 defines a support pin 17' that projects into the channel 11 for supporting engagement with the screw 14. The connector 20' and the supporting pin 17' jointly define an axis of rotation of the screw 14.

During operation of the screw conveyor 1, the screw 14 is driven to rotate inside the channel 11 by the drive unit 20. Material that enters the inlet(s) 12 will be transported to the outlet(s) 13 by a pushing motion imparted by the rotating screw 14.

One specific use of the screw conveyor 1 is to convey food powder. In this context, food powder refers to a powder of any food material. A food material is any material that can be safely ingested by a human or animal. A powder is any collection of discrete solid particles that generally flow freely when shaken or tilted. Such solid particles may have a size ranging from nanometers to several millimeters.

To meet hygienic requirements, the screw conveyor needs to be intermittently cleaned, for example in accordance with a predefined schedule or when there is a change of material to be conveyed by the screw conveyor 1. To clean the screw conveyor, the end plate 17 may be detached from the casing 10. Any type of cleaning process may be performed, for example by use of a detergent, hot water, compressed air, etc. The channel 11 may be cleaned with the screw 14 in place. Alternatively, the screw 14 may be retracted from the channel 11, whereupon the channel 11 and/or the screw 14 is cleaned. After cleaning, with the screw 14 in place, the end plate 17 is re-attached to the casing 10. However, it may also be desirable or required to open the screw conveyor 1 at the opposite end to clean the channel 11. For example, it may be difficult to properly clean the remote end of the channel 11 from the second portion 16B if the channel 11 is long, for example several meters. Further, the screw conveyor 1 may be positioned in such a way that it is difficult to access the second portion 16B, or at least to withdraw the screw 11 from the channel 14 when the end plate 17 has been removed.

It should be understood that screw conveyors 1 as used, e.g., in food processing are heavy machinery. The drive unit 20 may be quite heavy and difficult to handle manually. It is not uncommon that the weight of the drive unit 20 is in the range of 10-100 kilograms. Thus, cleaning of the screw conveyor 1 may require additional lifting equipment and/or the work effort of several machinists. Similar difficulties arise during service of the screw conveyor 1, for example to replace or repair the screw 14 or other internal components.

The Applicant has found a practical way of mitigating these difficulties, by providing an accessory that is configured to support the drive unit 20 when detached from the casing 10. The accessory thus forms a support unit, which is configured for attachment to the casing 10 and to the drive unit 20. One design feature of the support unit is that it, when attached, defines a pivoting movement of the drive unit 20 away from the first portion 16A when the drive unit 20 has been released from the casing 10. Thereby, the support unit 30 will define a controlled movement path of the drive unit 20 to uncover the opening of the channel 10 at the first portion 16A and provide access to the channel 11 and the screw 14. In some embodiments, the pivoting movement is defined in relation to a pivot axis that is fixed to be substantially parallel to gravity. Thereby, the weight of the drive unit 20 will be directed substantially along the fixed pivot axis and exert a minor driving force on the pivoting movement around the pivot axis. The need for manual handling of the weight of the drive unit 20 will be correspondingly limited. In this context, "substantially along" may imply an angle between the pivot axis and the direction gravity of less than ±20°, ±15°, ±10° or ±5°.

Another, optional, design feature of the support unit is that it, when attached, defines a sliding movement of the drive unit 20 away from the first portion 16A when the drive unit 20 has been released from the casing 10. Such a sliding movement may facilitate detachment of the drive unit 20 from the casing 20 and from the screw 14. For example, the sliding movement may serve to release the connector 20' from the screw 14. Further, the sliding movement may be used to move the drive unit 20 further out of the way. The sliding movement may be defined to follow a linear path. In some embodiments, the sliding movement is defined to be substantially transverse to gravity. Thereby, the weight of the drive unit 20 will exert a minor driving force on the sliding movement, and the need for manual handling of the weight of the drive unit 20 will be correspondingly limited. In this context, "substantially transverse" may imply an angle between the sliding movement and a direction transverse to gravity of less than ±20°, ±15, ±10° or ±5°.

An example of the support unit is shown in FIGS. 2-6 and designated by reference numeral 30. The screw conveyor 1 combined with the support unit 30 is denoted "screw conveyor arrangement" and designated by reference numeral 1'. Elements of the screw conveyor in FIG. 1 are also present in the screw conveyor in FIGS. 2-6 and will not be described in further detail. Compared to FIG. 1, the screw conveyor 1 in FIGS. 2-6 has an optional safety arrangement comprising switches 41, 42 which are attached, by a respective bracket (cf. 41A in FIG. 6), to the casing 10 at the respective portion 16A, 16B and configured to indicate when the casing 10 is opened at either end. A control unit (not shown) of the screw conveyor 1 may be configured to automatically disable the drive unit 20 whenever a switch 41, 42 indicates that the casing 10 is opened.

Figure 2:
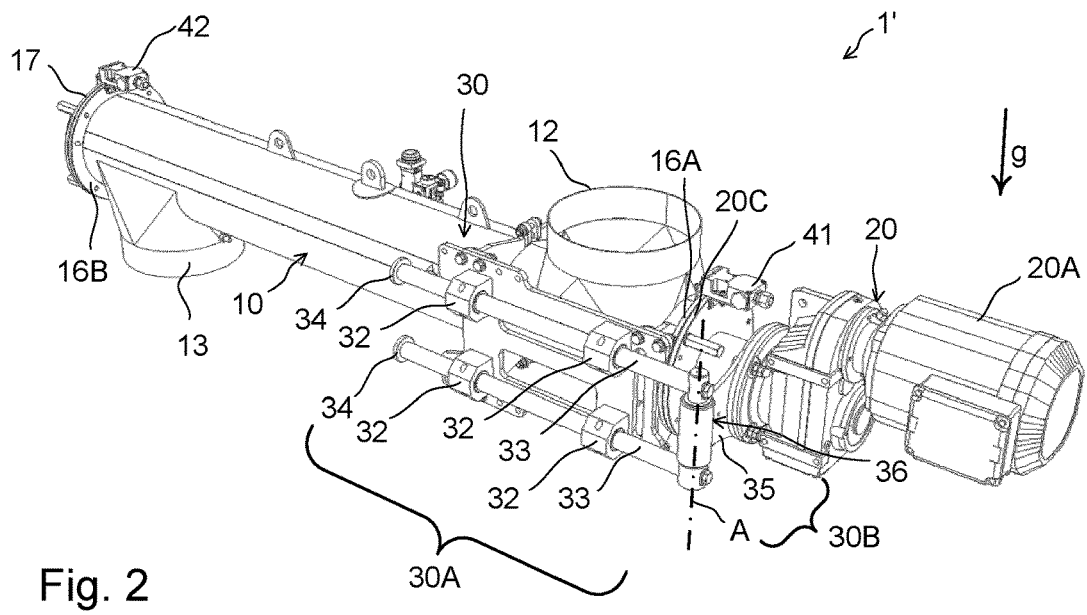
FIG. 2 is a perspective view of a screw conveyor provided with a support unit in accordance with an embodiment.

As shown in the perspective view of FIG. 2, the support unit 30 comprises a first sub-unit 30A and a second sub-unit 30B, which are joined by a hinge 36. The hinge 36 defines a pivot axis A for the above-mentioned pivoting movement. The first sub-unit 30A is attached to the casing 10, and the second sub-unit 20B is attached to the drive unit 20. As indicated in FIG. 2, the support unit 30 is attached to the screw conveyor 1 with the pivot axis A substantially parallel to the direction of gravity, represented by an arrow g.

Figure 3:
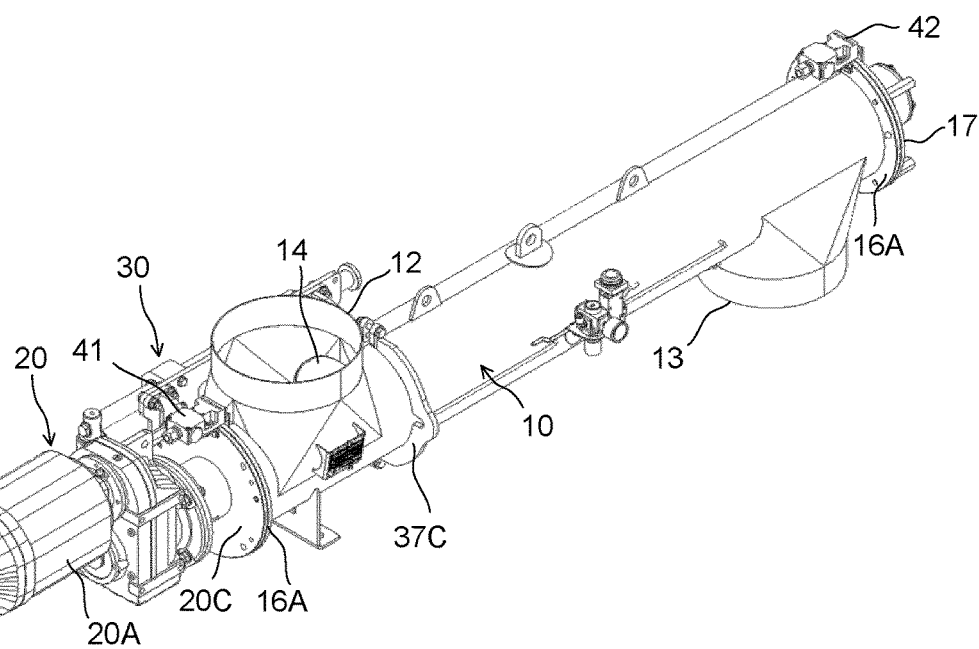
FIGS. 3-4 are perspective views of the screw conveyor arrangement in FIG. 2 before and after dismounting of a drive unit.
Figure 4:
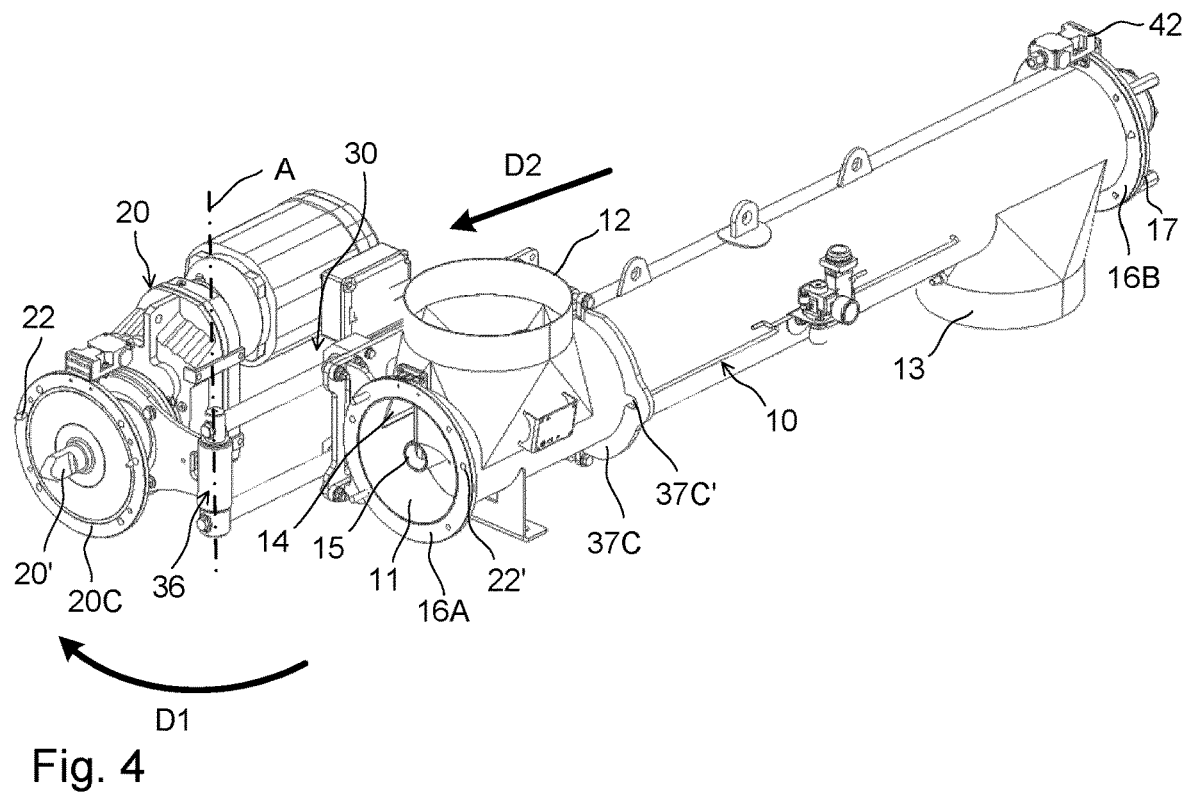

FIGS. 3-4 are perspective views of the screw conveyor arrangement 1' before and after detachment of the drive unit 20 from the casing 10. In FIG. 4, bolts 38 (FIG. 5) connecting the drive unit flange 20C to the end flange 16A have been unscrewed to release the drive unit 20 from the casing 10. Further, the drive unit 20 has been manually pulled in direction D2 to slide away from the casing 10 to expose the open end of the channel 11, and in direction D1 to swing away from the open end of the channel 11 around the pivot axis A. As seen, the pivoting movement D1 moves the drive unit 20 well away from the open end. It is realized that the channel 11 and the screw 14 are accessible for cleaning or any other service and maintenance. Further, the screw 14 may be retracted from the channel 11. In the illustrated example, the sliding movement D1 releases the connector 20' from its form-fitted engagement with the central shaft 15 of the screw 14. In the illustrated example, the connector 20' is a drive pin configured to fit inside the open end of the central shaft 15. The sliding movement D1 also releases projecting guiding pins 22 on the drive unit flange 20C from corresponding guiding holes 22' in the end flange 16A.

Figure 5:
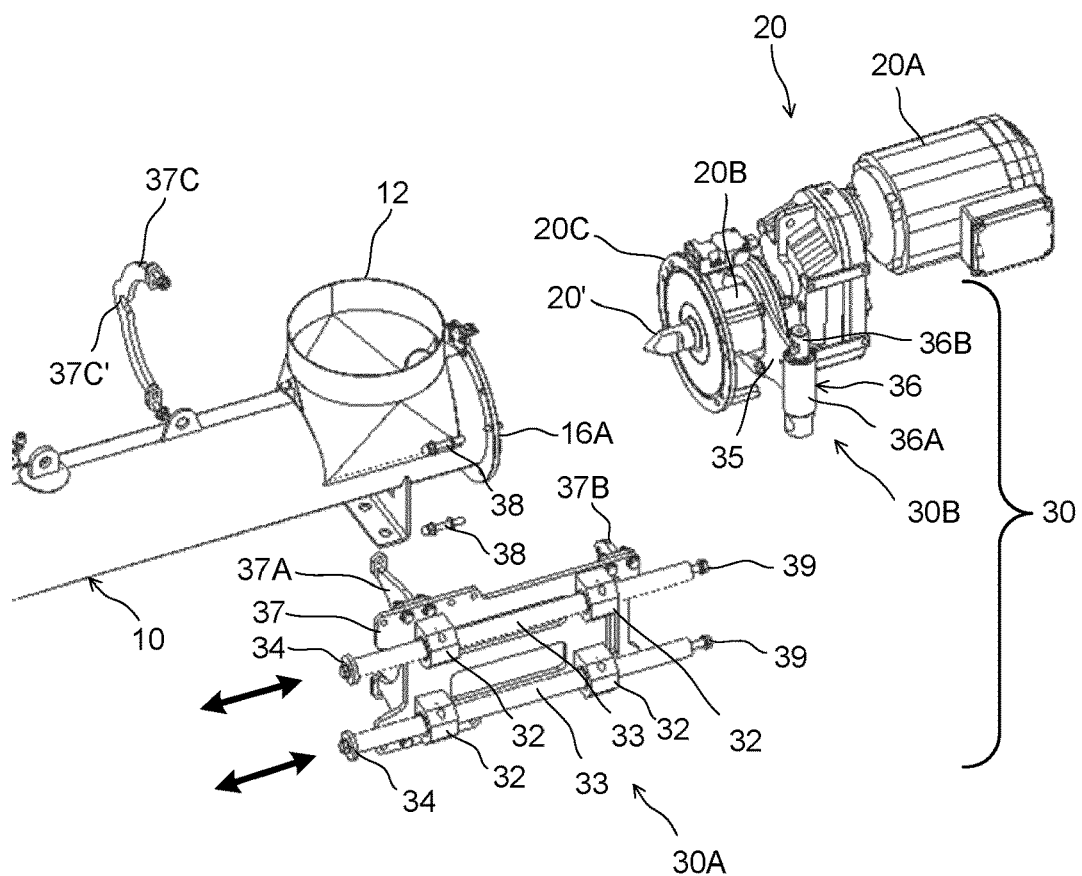
FIGS. 5-6 are partially exploded perspective views of an end portion of the screw conveyor arrangement in FIGS. 2-4.
Figure 6:
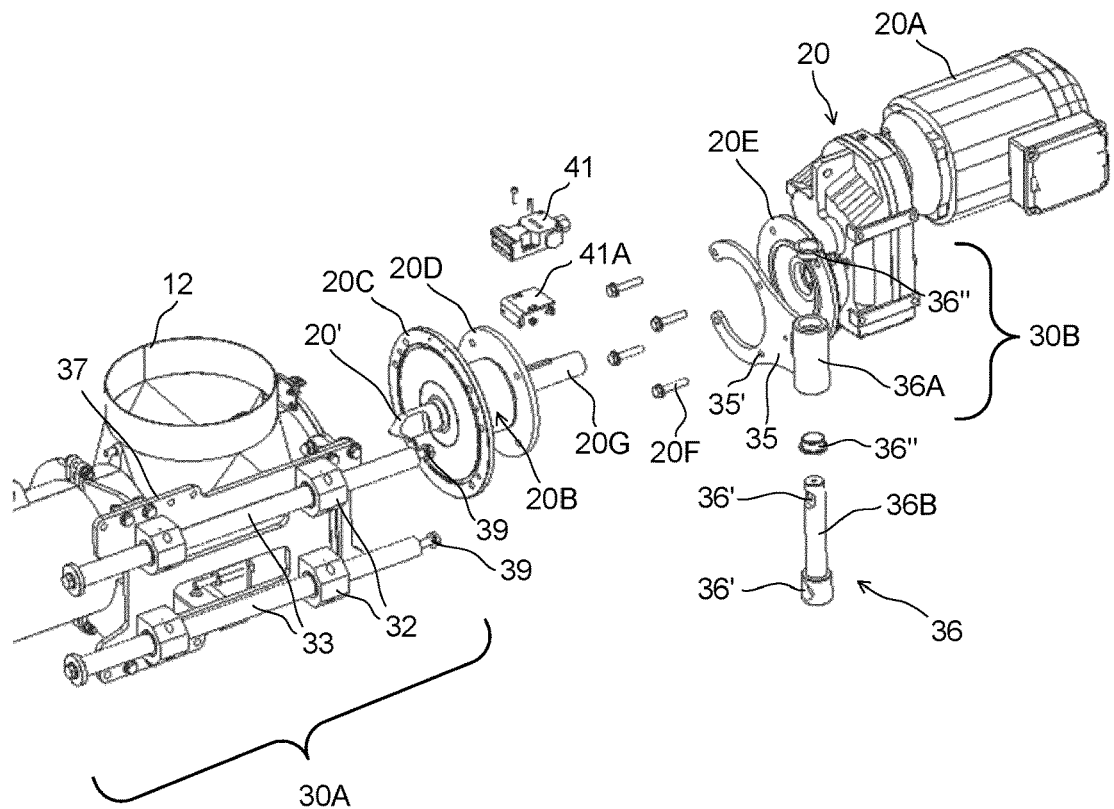

The structure of the support unit 30 in the illustrated example is further depicted in the partially exploded perspective views of FIGS. 5-6. The hinge 36 ("hinge element") comprises a pivot pin 36B, which is arranged for rotation in a guide element 36A that defines a collar for receiving the pivot pin 38B. To ensure free rotation of the pivot pin 36B in the guide element 36A, guide rings 36" (FIG. 6) may be fitted into the collar to define a spacing between the pivot pin 36B and the internal surface of the collar. The guide element 36A is part of the second sub-unit 30B. In the illustrated example, the guide element 36A is an integral part of a plate-shaped connection element 35, which is configured for attachment to the drive unit 20. The connection element 35 is installed between the motor 20A and the block 28B and defines a central opening for passage of a transmission shaft 20G of the block 20B. When the block 20B is mounted to the motor 20A, the transmission shaft 20G extends into and engages the motor 20A. In the illustrated example, the connection element 35 is fork-shaped. As seen in FIG. 6, the connection element 35 defines through holes 35' that are arranged to mate with attachment holes on a mounting flange 20E of the motor 20A and on a mounting flange 20D of the block 20B. Bolts 20F are arranged in the attachment holes and through holes 35' to fix the second sub-unit 30B between the motor 20A and the block 20B. In a variant, not shown, the connection element 35 is instead configured for installation between the end flange 16A and the drive unit flange 20C on the opposite end of the block 20B.

The first sub-unit 30A defines the sliding movement by slider elements which are arranged to be slidable relative to a base element, which in turn is configured to be attached to the casing 10. In the illustrated example, the slider elements are support rods 33 that are arranged for sliding movement in holders 32 and connected to the hinge 36. Each support rod 33 is arranged in two spaced apart holders 32, although further holders 32 may be used for each support rod 33. The holders 32 are attached to a base plate 37 to define two linear and parallel movement paths for the support rods 33, as indicated by double-ended arrows in FIG. 5. One end of each support rod 33 comprises a stop 34 to limit the displacement of the drive unit 20 away from the casing 10 by the sliding movement. The other end of each support rod 33 comprises a fastener 39 for connecting the support rod 33 to the pivot pin 36B. In the illustrated example, the ends of the rods 33 are received in mounting holes 36' at a respective end of the pivot pin 36B. The ends of the rods 33 define a threaded hole, and bolts 39 are arranged to extend through the mounting holes 36' in engagement with the threaded holes in the rods 33.

The base plate 37 is attached to the casing 10 to arrange the support rods 33 substantially transverse to the direction of gravity and on top of each other (in the direction of gravity), to thereby arrange the hinge 36 with its pivot axis A substantially parallel to the direction of gravity.

In the illustrated example, the base plate 37 comprises a clamping element which is shaped to surround at mate with the outer contour of the casing 10 to fix the first sub-unit 30A to the casing 10. The clamping element comprises a first part 37A, which projects from the base plate 37, and a separate second bracket-shaped part 37C. The second part 37C is configured to be attached to the first part 37A to fix the base plate 37 to the casing 10. At least one of the first and second parts 37A, 37C may comprise one or more engagement elements for form-fitted engagement with the casing 10, as exemplified by a notch 37C' on the second part 37C for engagement with a projecting rib on the casing 10 (FIG. 4). The engagement element 37C' serves to fix the clamping element to the casing 10 also when the drive unit 20 is swung away from the casing 10, which significantly increases the moment at the clamping element. The base plate 37 may comprise two or more clamping elements. However, in the illustrated example, the base plate 37 comprises a projecting tab 37B, which is configured to be attached to end flange 16A. For example, bolts may be arranged in through holes on the tab 37B and engaged with the flange 16A. This use of the tab 37B will effectively eliminate the risk that the first sub-unit 30A is dislodged by the weight of the drive unit 20 but requires adaptation of the tab 37B to the flange 16A, or vice versa. In the illustrated example, the tab 37B is attached to the flange 16 by the same bolts 38 that are used for connecting the end flange 16 to the drive unit flange 20C.

The screw conveyor arrangement 1' as described hereinabove and shown on the drawings is merely given as an example. Many variations are possible, as readily appreciated by the person skilled in the art. For example, the slider element may include any number of support rods. A single support rod may be used, although improved stability and robustness is achieved with at least two support rods. Further, although the support unit 1 has been described as an accessory which is attached to an existing screw conveyor, the support unit may alternatively be an integral part of a screw conveyor.

Figure 7:
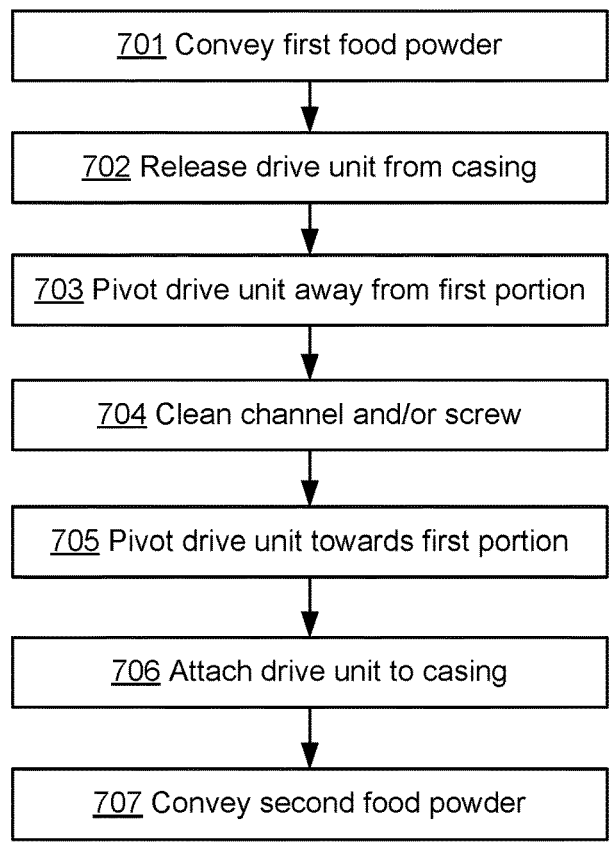
FIG. 7 is a flow chart of an example method of operating a screw conveyor arrangement.

FIG. 7 is a flow chart of an example method that may be performed in a food processing plant to convey food powder by use of a screw conveyor arrangement 1' as described herein. In step 701, the screw conveyor arrangement 1' is operated to convey a first food powder, for example by control signals from a control unit. After or during step 701, a need for cleaning of the screw conveyor is detected and the operation of the drive unit 20 is stopped. In step 702, the drive unit 20 is released from the casing 10 of the screw conveyor by an operator, for example by removing one or more connection elements. In step 703, the drive unit 20 is pivoted away from the first portion 16A by the operator by use of the support unit 30. In step 703, the operator may also slide the drive unit 20 away from the first portion 16A if a sliding movement is allowed by the support unit 30. In step 704, the operator performs a cleaning operation of the screw 14 and/or the channel 11. In step 705, when the cleaning operation is completed and the screw 14, if retracted, is re-installed in the channel 11, the drive unit 20 is pivoted, and optionally slid, back towards the first portion 16A by use of the support unit 30. In step 706, the drive unit 20 is re-attached to the casing 10. In step 707, the screw conveyor arrangement 1' is operated to convey a second food powder, which may be the same as or different from the first food powder.

The invention claimed is:
1. A screw conveyor arrangement, comprising:
   a casing that defines an elongate channel,
   a helical screw which is arranged in the channel to extend from a first portion of the casing to a second portion of the casing,
   a drive unit, which is releasably connected to the casing at the first portion and arranged to engage the helical screw, and
   a support unit which is attached to the casing and to the drive unit and configured to define a pivoting movement of the drive unit away from the first portion when the drive unit has been released from the casing;
   wherein the support unit comprises a hinge element that defines a pivot axis for the pivoting movement;
   wherein the support unit comprises a first sub-unit for attachment to the casing, and a second sub-unit for attachment to the drive unit, wherein the first and second sub-units are joined by the hinge element;
   wherein the first sub-unit comprises a base element for attachment to the casing, and a slider element which is arranged for sliding movement relative to the base element in a direction substantially transverse to gravity, wherein the slider element is joined to the second sub-unit by the hinge element;
   wherein the slider element comprises a support rod which is arranged for sliding movement in spaced apart holders on the base element; and
   wherein the slider element comprises a further support rod, which is arranged for sliding movement in spaced apart further holders on the base element, wherein the support rod and the further support rod are mutually parallel and connected to the hinge element.
2. The screw conveyor arrangement of claim 1, wherein the support unit is further configured to define a sliding movement of the drive unit away from the first portion casing when the drive unit has been released from the casing.
3. The screw conveyor arrangement of claim 1, wherein the support unit is attached to the casing with the pivot axis of the hinge element substantially parallel with gravity.
4. The screw conveyor arrangement of claim 1, wherein the hinge element comprises a pivot pin arranged in a guide element, wherein the guide element is part of the second sub-unit, and wherein the first sub-unit is connected to the pivot pin.
5. The screw conveyor arrangement of claim 1, wherein the support rod is connected to the hinge element.
6. The screw conveyor arrangement of claim 1, wherein the base element is attached to the casing to arrange the support rod above the further support rod, and wherein an end of the support rod and an end of the further support rod are connected to the hinge element.
7. The screw conveyor arrangement of claim 6, wherein the base element comprises a clamp portion which is releasably attached to the casing, wherein the clamp portion is arranged to surround the casing and comprises a releasable bracket, which is shaped to mate with an outer contour of the casing.
8. The screw conveyor arrangement of claim 1, wherein the casing comprises a support pin that projects into the channel at the second portion, wherein the drive unit comprises a drive pin that projects into the channel at the first portion when the drive unit is connected to the casing at the first portion, and wherein the helical screw is arranged in engagement with the drive pin and the support pin.
9. A support unit for use in the screw conveyor arrangement of claim 1.
10. A method of conveying food powder with a screw conveyor arrangement according to claim 1, said method comprising:
    operating the screw conveyor arrangement to convey a first food powder;
    releasing the drive unit from the casing;
    pivoting the drive unit away from the first portion;
    cleaning at least one of the helical screw or the elongate channel;
    pivoting the drive unit towards the first portion;
    attaching the drive unit to the casing; and
    operating the screw conveyor arrangement to convey a second food power.

* * * * *